(12) United States Patent
Park et al.

(10) Patent No.: US 6,891,546 B1
(45) Date of Patent: May 10, 2005

(54) CACHE MEMORY FOR TEXTURE MAPPING PROCESS IN THREE-DIMENSIONAL GRAPHICS AND METHOD FOR REDUCING PENALTY DUE TO CACHE MISS

(75) Inventors: Se Jeong Park, Taejon-si (KR); Hoi Jun Yoo, Taejon-si (KR); Kyu Ho Park, Taejon-si (KR)

(73) Assignee: Korea Advanced Institute of Science and Technology, Taejon-si (KR)

( * ) Notice: Subject to any disclaimer, the term of this patent is extended or adjusted under 35 U.S.C. 154(b) by 310 days.

(21) Appl. No.: 09/596,775

(22) Filed: Jun. 19, 2000

(30) Foreign Application Priority Data

Jun. 19, 1999 (KR) ......................................... 1999-23092

(51) Int. Cl.[7] .............................................. G06G 11/40
(52) U.S. Cl. ....................... 345/552; 345/557; 345/582; 345/428; 345/587
(58) Field of Search ................................. 345/552, 557, 345/582, 606–610, 428, 558

(56) References Cited

U.S. PATENT DOCUMENTS

| 4,837,722 | A | * | 6/1989 | Sara .......................... 708/290 |
| 5,453,790 | A | * | 9/1995 | Vermeulen et al. |
| 5,946,003 | A | * | 8/1999 | Zakharia |
| 5,990,902 | A | * | 11/1999 | Park |
| 6,236,405 | B1 | * | 5/2001 | Schilling et al. ............. 345/582 |
| 6,417,860 | B1 | * | 7/2002 | Migdal et al. ............... 345/582 |

OTHER PUBLICATIONS

Igehy et al. (Prefetching in a Texture Cache Architecture), Aug. 1998, ACM Press New York, NY, USA.*
"The Clipmap: A Virtual Mipmap", By Tanner et al., published by Silicon Graphics Computer Systems.
"Texram: A Smart Memory for Texturing", By Schilling et al., published May 1996, University of Tubingen.
"The Design and Analysis of a Cache Architecture for Texture Mapping", By Hakura et al., Computer Systems Laboratory, Stanford University.

* cited by examiner

*Primary Examiner*—Matthew C. Bella
*Assistant Examiner*—Hau Nguyen
(74) *Attorney, Agent, or Firm*—Bachman & LaPointe, P.C.

(57) ABSTRACT

A cache memory for a texture mapping process which is applicable to a high performance three-dimensional graphics card for a personal computer, three-dimensional game machines and other fields requiring small and high performance three-dimensional graphics. In particular, in order to accelerate a texture mapping process based upon a hardware-used mipmapping process using a trilinear interpolation in a three-dimensional graphics system, there is provided a cache memory in which only textures by a moderate size of a working set are stored, and all eight texels needed to perform a trilinear interpolation only in one clock cycle are accessed to obtain a final texel value, and a method enabling a reduction in penalty due to a cache miss by, with hardware-based prediction, prefetching textures to be needed in the future. The invention makes it possible that various sizes of texture images are effectively processed and texture mapping acceleration becomes possible even for small and low cost systems, as compared with a conventional hardware-based texture mapping acceleration method.

4 Claims, 5 Drawing Sheets

Projected Image to a Screen (2D)

CACHE MEMORY FOR TEXTURE MAPPING PROCESS IN THREE-DIMENSIONAL GRAPHICS AND METHOD FOR REDUCING PENALTY DUE TO CACHE MISS

BACKGROUND OF THE INVENTION

1. Field of the Invention

The present invention relates to a cache memory for a texture mapping process which is applicable to a high performance three-dimensional graphics card for a personal computer, three-dimensional game machines and other fields requiring small and high performance three-dimensional graphics. More particularly, the present invention relates to a cache memory capable of accelerating a texture mapping process based upon a hardware-used mipmapping process using a trilinear interpolation, and a method enabling a reduction in penalty due to a cache miss by, with hardware-based prediction, prefetching textures to be needed in the future.

2. Description of the Prior Art

For a three-dimensional graphics system, a texture mapping technique is mainly used to obtain more realistic scenes. Texture mapping is a technique that applies a two-dimensional image acquired by a camera, onto an object's surface in order to have a textured surface of a three-dimensional object, wherein the texture refers to a two-dimensional source image and each point element in the texture is called a texel to be associated with each pixel of the displayed portion.

Rather than, after applying the two-dimensional image, or texture, on a surface of the three-dimensional object, projecting the result to a two-dimensional display screen, a method permitting a reduction in computational amount in applying the above-mentioned texture mapping technique is used which includes obtaining coordinates of the object's surface in the three-dimensional space from each pixel of the image projected to the two-dimensional screen, computing two-dimensional texture coordinates corresponding thereto to obtain associated texels, and defining colors of the pixels to be represented on the display screen.

However, such a texture mapping technique causes an aliasing phenomenon, because an area in the texture space, mapped to one pixel represented on the display screen, is not exactly mapped to an area of one texel.

The concept of the mipmapping technique will be explained with reference to FIG. 1 representing an example. On the right side of FIG. 1, there is shown a road projected to the two-dimensional display screen. Assuming that pixels located near the observer and associated with an area 'a' or 'b' of the projected road are to be mapped into one texel in the texture space, other pixels located far from the observer and associated with, such as, an area 'c' or 'd' would be mapped into the texels in the texture space. Therefore, one texture, capable of being representative of the texels, needs to be taken to be mapped into one pixel on the display screen. Otherwise, a distorted image results.

As an easy method of obtaining one representative texel, a method is frequently used in which the representative texel is obtained by taking an average of the values of all texels in the area mapped into the texture space, which method is called a texture filtering.

However, since the above-described texture filtering is a time consuming process, the mipmapping technique is frequently used as a less time consuming process.

In the mipmapping process, as shown on the left side of FIG. 1, the original or base texture image (which is an image indicated by LOD 0 in FIG. 1, wherein the LOD (Level Of Detail) denotes a value representing the number of texels to which one pixel on the display screen corresponds) is pre-filtered and subsampled to prepare textures or mipmaps of various LOD levels. Based upon the LOD and (u, v) coordinates which are computed at the time when the pixel to be displayed on the screen is mapped into the texture space, the texels required are taken from appropriate LOD levels on the mipmap and then displayed on the screen.

While the computed LOD value and (u, v) coordinates which are mapped onto the texture space appear as mixed numbers, respectively, i.e., (x, y) coordinates on the screen in integer representation are coordinate-transformed by using a transform matrix to give the mixed numbers, the values presently existing on the mipmap are associated with the locations of the integer value of the LOD and the (u, v) coordinates in integer representation. Accordingly, there is no texel value at the location of the precise LOD and (u, v) coordinates in the texture space into which the pixel to be rendered on the display screen is mapped. However, the integer values nearest those non-integer texel values are read from the mipmap, and then the distance difference between the read values and the values at the accurate locations are used for the interpolation.

Referring to FIG. 2, the following is to explain an example on how to obtain the texel value with respect to a pixel mapped with the LOD=0.6 and (u, v)=(23.25, 30.50).

(i) Since the value of the LOD is 0.6, the (23, 30), (23, 31), (24, 30) and (24, 31) coordinates are selected from integers that are nearest to the values of u=23.25 and v=30.50, at the level of LOD 0, from which the texel values are read to obtain the representative value at the level of LOD 0, based on the distance between the actual exact coordinates and those coordinates.

(ii) To obtain the representative value at the level of LOD 1, the (11, 15), (11, 16), (12, 15) and (12, 16) coordinates are selected from integers that are nearest to the values of u=23.25/2=11.62 and v=30.50/2=15.25, from which the telex values are read to obtain the representative value at the level of LOD 1, based on the distance between the actual exact coordinates and those coordinates.

(iii) The difference between the two representative values thus obtained and the actual exact value, 0.6 of LOD, is used to obtain the final representative texel value, as shown in FIG. 2.

The mipmapping technique previously prepares the textures with various levels of the LOD for high-speed texture mapping, reads eight texels to obtain a representative texel value to be used in executing the program, and performs the interpolation (such an interpolation method is called a trilinear interpolation) and uses the interpolated resulting value as a representative value.

While the above-mentioned mipmapping technique provides more rapid processing, a problem still remains in that a large amount of time is required to sequentially read eight texels from the memory which is needed to perform the three-dimensional graphics mipmapping process.

Therefore, in order to solve such a problem, there has been proposed a structure as shown in FIG. 3, which enables a representative texel value to be obtained, by providing separate memory banks capable of storing texels of two levels of LOD, accessing simultaneously eight texels using the memory banks where the texels are stored with the mapping relation between the texels stored in each of the memory banks and the position of the texels in the texture space, as shown in FIG. 4 (where a number in each texel area denotes a memory bank number to which the texel is to be stored) and sending the accessed eight texels to the trilinear interpolator to perform the interpolation in one clock cycle, and obtaining a representative texel value.

However, since various sizes of texture images are used in applications of the actual three-dimensional graphics system, the use of texram as shown in FIG. 3 leads to the need of a memory of more capacity than that of a texture image to be used in the future. In a case where the value of the LOD greatly varies every time each pixel is rendered, the time is considerably consumed in a continuous change of the contents of the memory. This results in inefficient use of the memory and an increase in cost. Thus, the structure as shown in FIG. 3 has a drawback in the practical use.

Proposed as another common concept is a clipmap, which enables a great reduction in the memory capacity of the system in a texture mapping process using a large texture image. In this scheme, since on the mipmap as shown in FIG. 5, the lower the LOD level is, the more the space for storing the texture image is increased in geometrical progression, only the textures of several upper levels of the LOD are placed in upper portions of the current system memory, and the currently rendered portions among the reaming values of the LOD levels are also placed. If necessary, other portions can be fetched and used from a hard disk where the overall mipmap has been stored.

However, the above-mentioned clipmap method is applied between the hard disk and the system memory and entirely implemented in a software manner. Therefore, the main object of this method is essentially to reduce the capacity of the system memory, but not suitable for accelerating the texture mapping.

SUMMARY OF THE INVENTION

An object of the present invention is to solve the problems of a conventional prior art, and to provide a cache memory capable of accelerating a hardware-based mipmapping process, while a concept of a clipmap is applied to the relation between a system memory and a cache memory for a texture mapping process, and a method for reducing a penalty due to a cache miss.

The concept in technology for achieving the above-mentioned objects resides in a cache having a special structure making it possible that a cache memory for storing only textures by a working set in a moderate size thereof is prepared, all eight texels needed to perform a trilinear interpolation only in one clock cycle are accessed to obtain a final texel value, whereby various sizes of texture images are effectively processed and texture mapping acceleration becomes possible even for small and low cost systems.

The reduction of a penalty occurring at the time when a cache miss occurs can be accomplished by prefetching the textures to be needed in the future, by virtue of a hardware implemented for the prediction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 6:
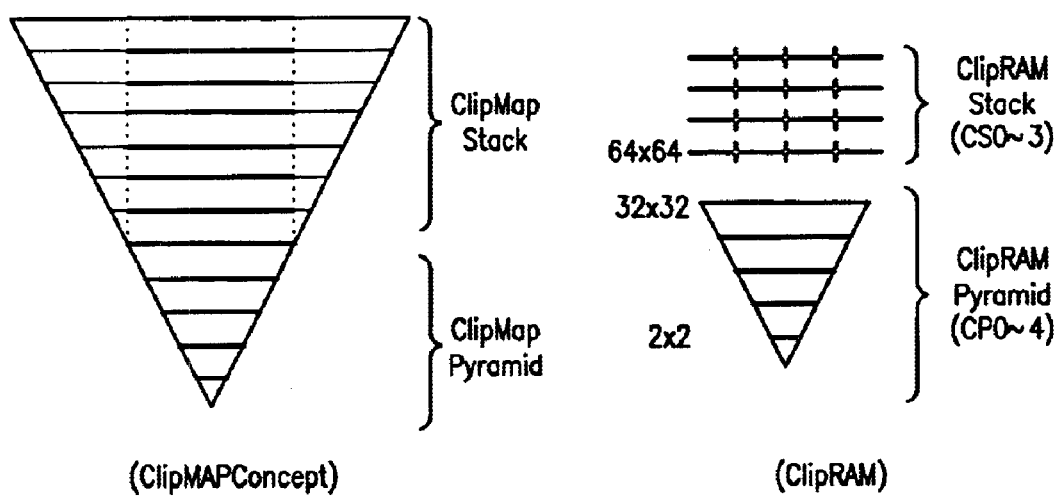
FIG. 6 is a conceptional diagram for explaining a cache memory for a texture mapping process according to one embodiment of the present invention.

The concept of a cache memory used in a texture mapping process is shown in FIG. 6, wherein the cache memory consists of a clip RAM pyramid in which all texels of several upper levels (e.g., five levels) of LOD are stored and a clip RAM stack in which only a working set currently needed among the remaining LOD levels is stored.

The clip RAM stack is able to store therein the working set of four levels of LOD, each level consisting of sixteen (4 by 4) sub-clips. These sub-clips may be, even at a normal operation, as well as at cache miss occurrence, replaced with the contents from an external memory which stores the whole mipmap, by a sub-clip predictor for predicting the required sub-clips in advance. Thus, the prefetch by the hardware is made possible, which leads to the reduction of the cache miss penalty.

Figure 7:
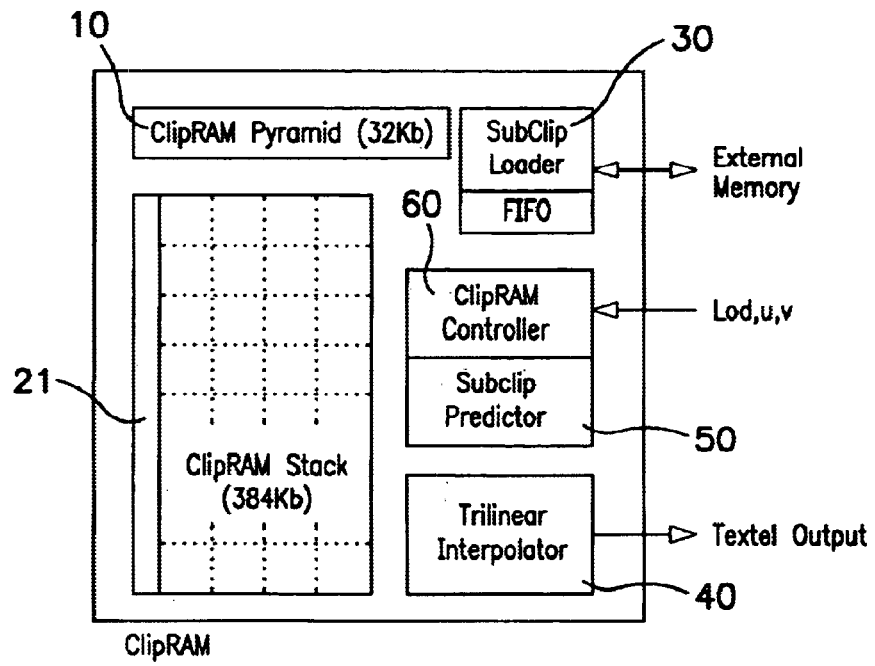
FIG. 7 is a diagram for showing a structure of a cache memory for a texture mapping process according to one embodiment of the present invention.

The cache memory organization for the texture mapping according to the above-mentioned concept is shown in FIG. 7.

The cache memory may be organized to include a first DRAM bank 10 configured as a clip RAM pyramid for storing all texels associated with several upper levels (e.g., five levels) of LOD, and a second DRAM bank 20 configured as a clip RAM stack for storing only a working set currently needed among the remaining levels of LOD, wherein both first and second DRAM banks 10 and 20 have respective SAM (Serial Access Memory) ports used for reading the texture for trilinear interpolation and bringing new texture sub-clips from the outside. The cache memory also includes a sub-clip loader 30 connected to the SAM ports of the first and second DRAM banks 10 and 20, and for fetching new texture sub-clips from an external memory, a trilinear interpolator 40 for taking four texels from respective two layers on the mipmap and performing the trilinear interpolation, a sub-clip predictor 50 for performing a hardware-based prediction and prefetching the sub-clips in order to reduce a penalty due to cache miss, a controller 60 for controlling the above components, and a CAM (Content Addressable Memory) 21 for checking if eight texels existing at an integer coordinate relative to an LOD and (u, v) coordinates are located in the first and second DRAM banks 10 and 20, when the LOD and (u, v) coordinates mapped into a texture space with respect to a pixel to be rendered on a display screen are input to the controller 60.

The basic operation of the cache memory for the texture mapping thus structured will be explained.

All texels for a current texture, also associated with several upper levels of LOD, are stored in the first DRAM bank 10 for the clip RAM pyramid, whose contents, therefore, do not need to be changed during the processing. Since the second DRAM bank 20 for the clip RAM stack stores, however, only the working set currently needed, the continuous change of the contents thereof is required. In case the LOD and (u, v) coordinates in the texture space into which a pixel to be presently drawn is mapped are entered, the CAM (Content Addressable Memory) 21 is used to check the first and second DRAM banks 10 and 20 as to if eight texels exist at the coordinates on the integer basis, with respect to the LOD and (u, v) coordinates or not, and if found, the found eight texels are simultaneously read to subsequently perform the trilinear interpolation in the trilinear interpolator 40.

However, if not found, the cache miss occurs. At this time, the controller 60 makes the sub-clip loader 30 take from the external memory the sub-clips containing the necessary texels which are read by the trilinear interpolator 40 performing the trilinear interpolation.

To reduce a penalty in the event of the cache miss, the cache memory for the texture mapping according to the present invention is provided with the sub-clip predicator 50 which predicts the sub-clips to be soon needed, whereby it is possible to load from the outside new sub-clips not colliding with the sub-clips now being accessed during the normal texture cache operation.

The function of predicting the sub-clips, which the cache memory for the texture mapping has according to one embodiment of the present invention, will be explained in detail. It is possible to prefetch the contents of the cache memory on a sub-clip basis when the hardware-based prediction is made which includes two predictions, i.e., sub-clip prediction in one stack layer and stack layer prediction.

The prediction on the sub-clip in one stack layer will be explained.

Figure 1:
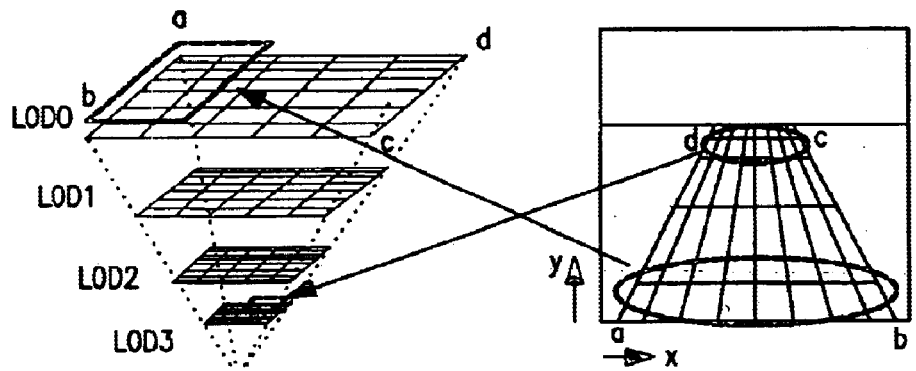
FIG. 1 is a conceptional diagram of a mipmapping process.
Figure 2:
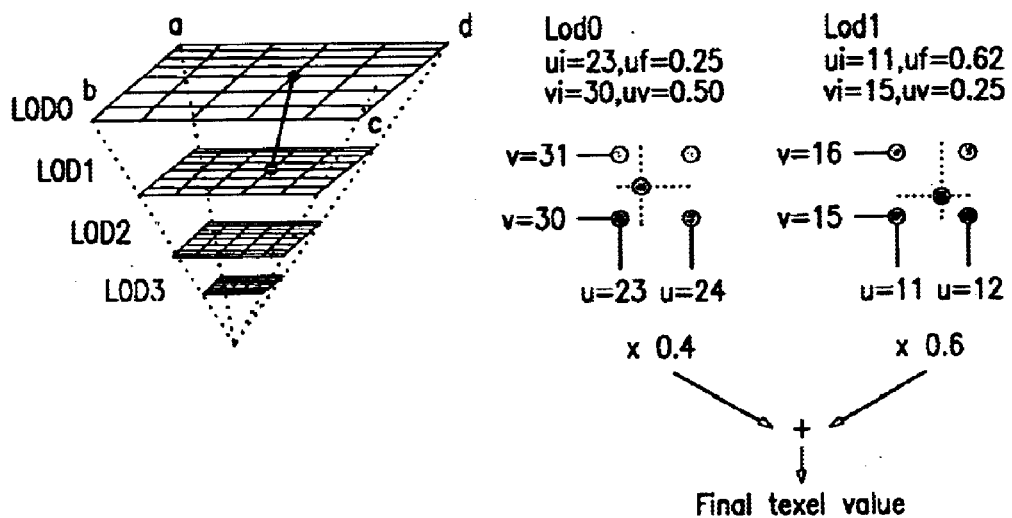
FIG. 2 is a diagram for explaining an example of a trilinear interpolation.
Figures 3, 4:
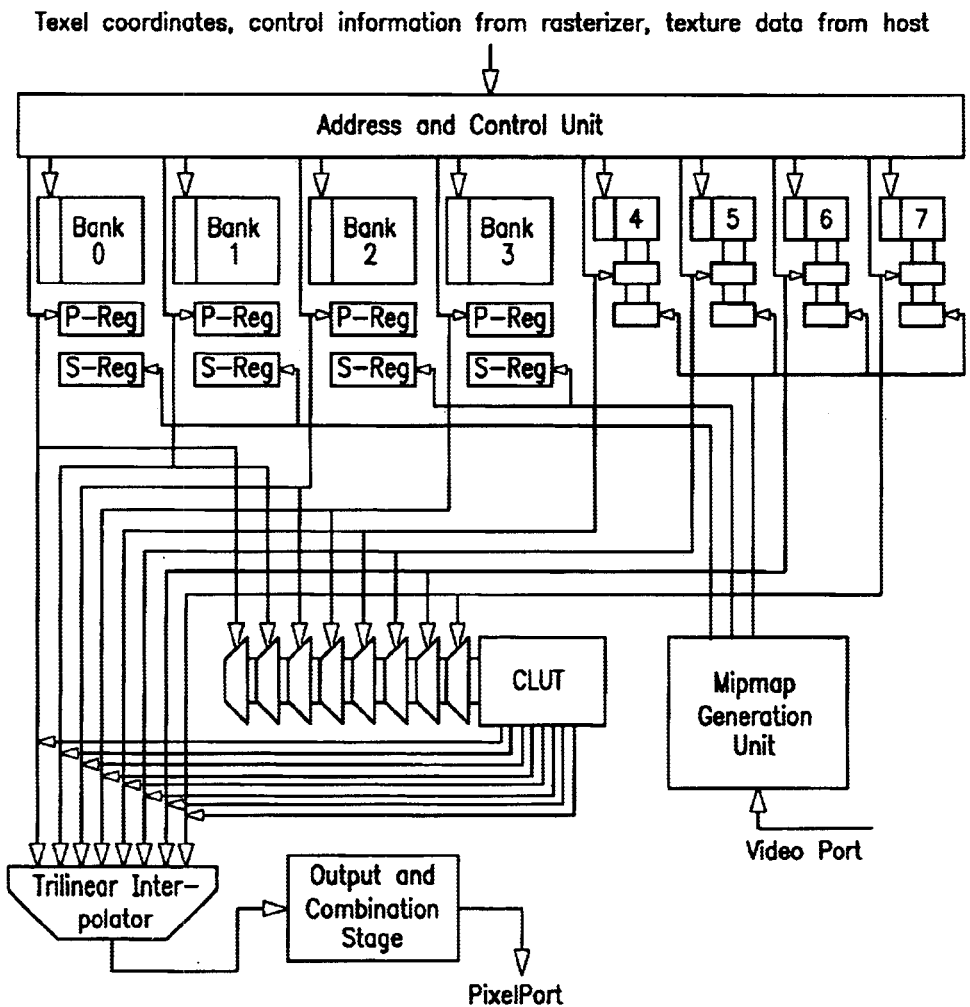
FIG. 3 is a diagram showing a structure of a texram.
FIG. 4 is a diagram showing an arrangement of texels in the texram.
Figure 5:
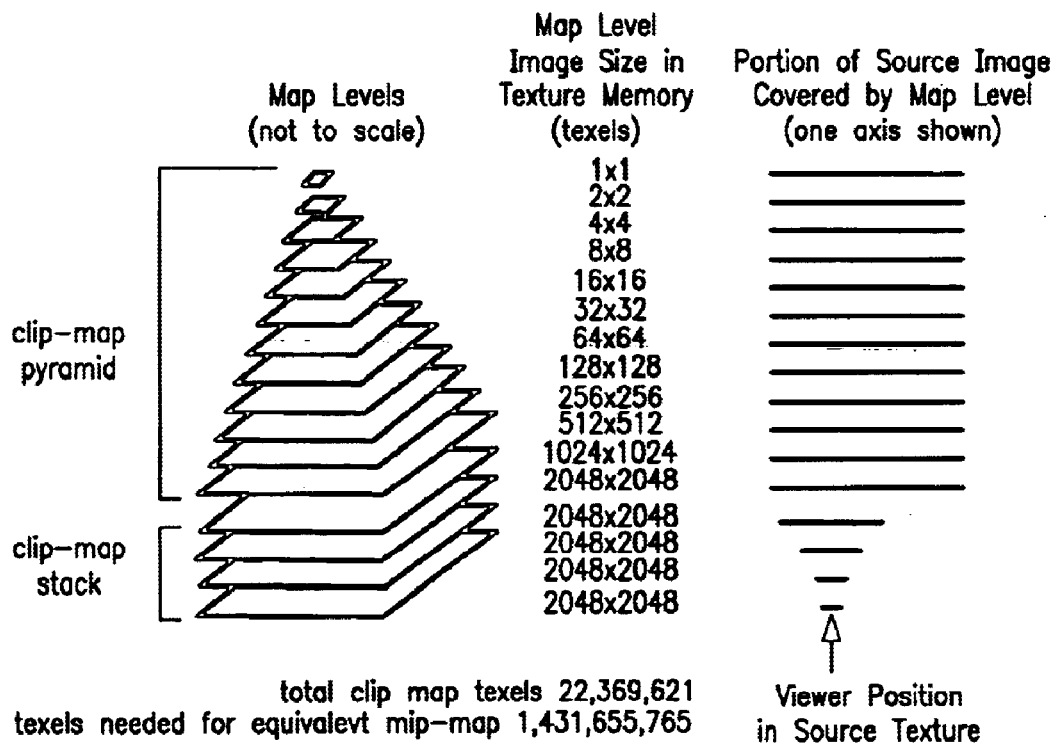
FIG. 5 is a conceptional diagram of a clipmap.
Figure 8:
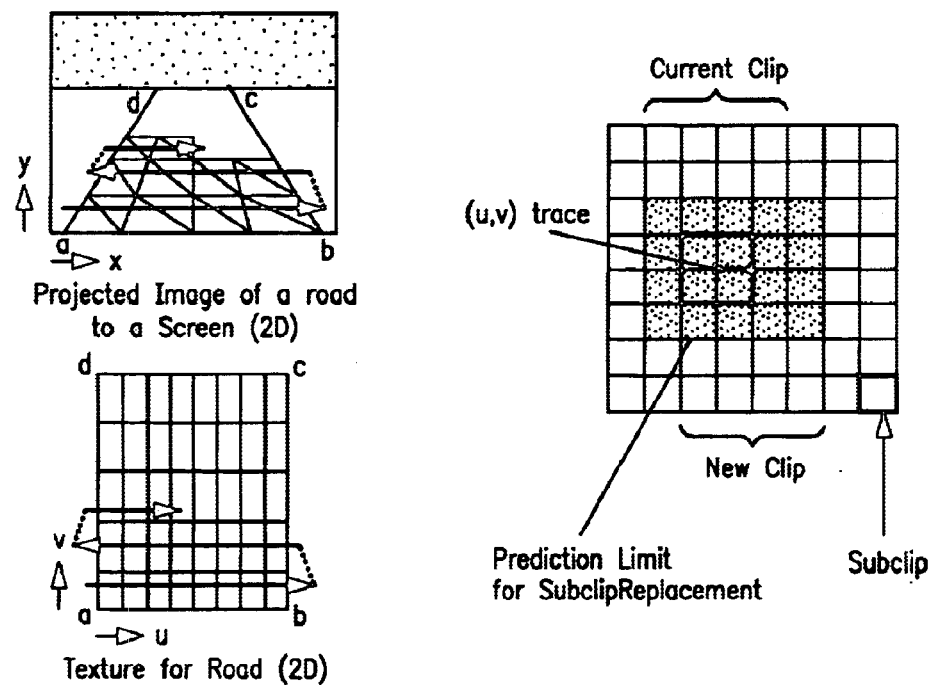
FIG. 8 is a diagram for showing procedures of predicting and replacing texture sub-clips.

FIG. 8 shows procedures on how to predict and replace the sub-clip to be soon needed, in which an upper left drawing in FIG. 8 illustrates an image on a two-dimensional display screen when, for example, a street in three dimensions is projected to the two-dimensional display screen. Typically, an object in the three-dimensional space may be represented as small triangles, which are stored in a data file as a set in which a series of triangles are collected. Therefore, when the street is rendered on the display screen as in FIG. 3, a series of triangles are in order rendered in a direction indicated by an arrow.

Referring to a lower left drawing in FIG. 8, four vertexes a, b, c and d of the texture image to be applied to the street are mapped into four vertexes a, b, c and d of the street shown in the upper left drawing in FIG. 8. A series of triangles on the display screen will be in order drawn in a direction indicated by an arrow. The access pattern of the texture image necessary for rendering has a feature in that the access is conducted in a direction indicated by an arrow represented in a left lower drawing in FIG. 8.

The use of such a feature may result as in the drawing to the right in FIG. 8 showing that the sub-clips on specific stack layers are predicted and replaced. The 4 by 4 sub-clips (current clips), represented as the shaded portions in the drawing, are the sub-clips in the current clip RAM stack. The trace on the (u, v) coordinates is shown as one example in which the texels are accessed over time. As shown in the drawing, the sub-clips may be bounded by the 2×2 sub-clips in size due to the hardware-based prediction limitation. If the tracing of the (u, v) coordinates goes beyond the boundary, the sub-clips to be soon needed will be prefetched to reduce the penalty at the time of the cache miss being likely to occur lately, even if the cache miss at this stage does not occur. The drawing shows the case of the tracing of the (u, v) coordinates which deviates from the prediction limitation. In this case, four sub-clips on the portions lightly shaded are prefetched and put into a left side area of 4 by 4 sub-clips. The prefetching is thus made possible based on the hardware-based prediction using the texture access scheme, and at the best case, it is possible to make the required sub-clips exist in the cache memory for the texture mapping, without the cache miss occurrence.

Figure 9:
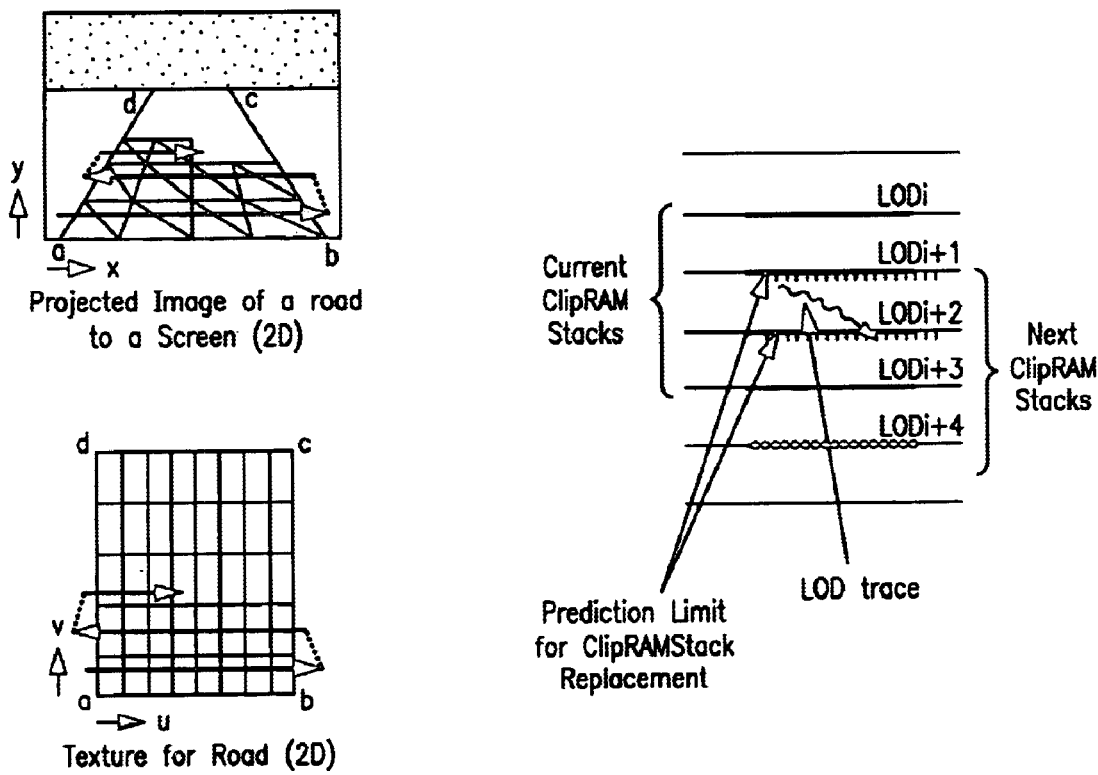
FIG. 9 is a diagram for showing procedures of predicting and replacing a texture stack layer.

FIG. 9 shows procedures on how to predict and replace the stack layer needed depending upon the change of the LOD, in which both-left upper and lower drawings in FIG. 9 are identical with those in FIG. 8. As shown in the drawing, when a series of triangles are rendered in a direction indicated by an arrow, a continuously increasing change of the LOD is generally observed, even if there is a minute change of the LOD. A right side drawing in FIG. 9 shows the tracing of the LOD which continuously increases. The current clip RAM stacks represent the levels of the LOD stored in the current clip RAM stack, among which two levels of the LOD are used as the prediction limitation on the stack layer. In this example, immediately after the tracing of the LOD reaches the LOD i+2, the contents of the stack layer corresponding to the LOD i+4 are loaded into an area having stored the contents of the LOD i, which means that the stack layer can also be, as with the sub-clips, prefetched based upon the hardware-based prediction.

As described above, the cache memory for the three-dimensional graphics texture mapping makes possible the hardware-based accelerated mipmapping process using the trilinear interpolation for various texture images in sizes thereof, and can also be applied to a small and low cost three-dimensional graphics system, whereby it is possible to provide a more realistic high-speed three-dimensional graphics process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cache memory for three-dimensional graphics texture mapping, comprising:

a first DRAM bank for storing all texels of predetermined upper levels of LOD (Level of Detail) and a second DRAM bank for storing only a working set currently needed among the remaining levels of LOD, wherein said first and second DRAM banks including SAM ports, respectively, each of said SAM ports reading a texture for a trilinear interpolation and fetching new texture sub-clips from the outside;

a sub-clip loader connected to said SAM ports of said first and second DRAM banks and for fetching new texture sub-clips from an external system memory;

a sub-clip predictor for performing a hardware-based prefetch of a sub-clip to be soon needed;

a plurality of data paths providing between said first and second DRAM banks and a trilinear interpolator, said data paths being adapted to access eight texels existing in the integer coordinates and LOD mapped into a texture space of a pixel to be rendered on a display screen, such that a trilinear interpolation is performed in one clock cycle;

a controller for controlling said components; and a CAM for checking if eight texels existing at an integer coordinate relative to an LOD and (u, v) coordinates are located in said first and second DRAM banks, when the LOD and (u, v) coordinates mapped into a texture space with respect to a pixel to be rendered on a display screen are input to said controller.

2. The cache memory according to claim 1, wherein said first DRAM bank forms a clip RAM pyramid for storing all texels associated with several upper levels of the LOD among overall mipmaps, and wherein said second DRAM bank forms a clip RAM stack for storing only a working set currently needed among the remaining LOD levels being not stored in said first DRAM bank.

3. The cache memory according to claim 1, wherein said second DRAM bank has a plurality of n×n sub-clips obtained by dividing a texture area on one level of LOD of the mipmap, and the contents of said cache memory are replaced on the sub-clip basis.

4. The cache memory according to claim 1, wherein said sub-clip predictor prefetch sub-clip predicted to be soon needed in a 3-dimensional space, so as to reduct a penalty due to cache miss.

* * * * *

UNITED STATES PATENT AND TRADEMARK OFFICE
CERTIFICATE OF CORRECTION

PATENT NO.    : 6,891,546 B1
DATED         : May 10, 2005
INVENTOR(S)   : Se Jeong Park et al.

It is certified that error appears in the above-identified patent and that said Letters Patent is hereby corrected as shown below:

Column 7,
Line 1, "said components" should read -- said first and second DRAM banks, said sub-clip loader, and said sub-clip predictor --.

Signed and Sealed this

Twenty-seventh Day of December, 2005

JON W. DUDAS
*Director of the United States Patent and Trademark Office*